Jan. 14, 1941.　　　　F. HARNISCH　　　　2,228,350

HYDRAULIC TRANSMISSION

Filed May 20, 1939　　　2 Sheets-Sheet 1

INVENTOR.
Fritz Harnisch
BY Robert Robb
ATTORNEYS

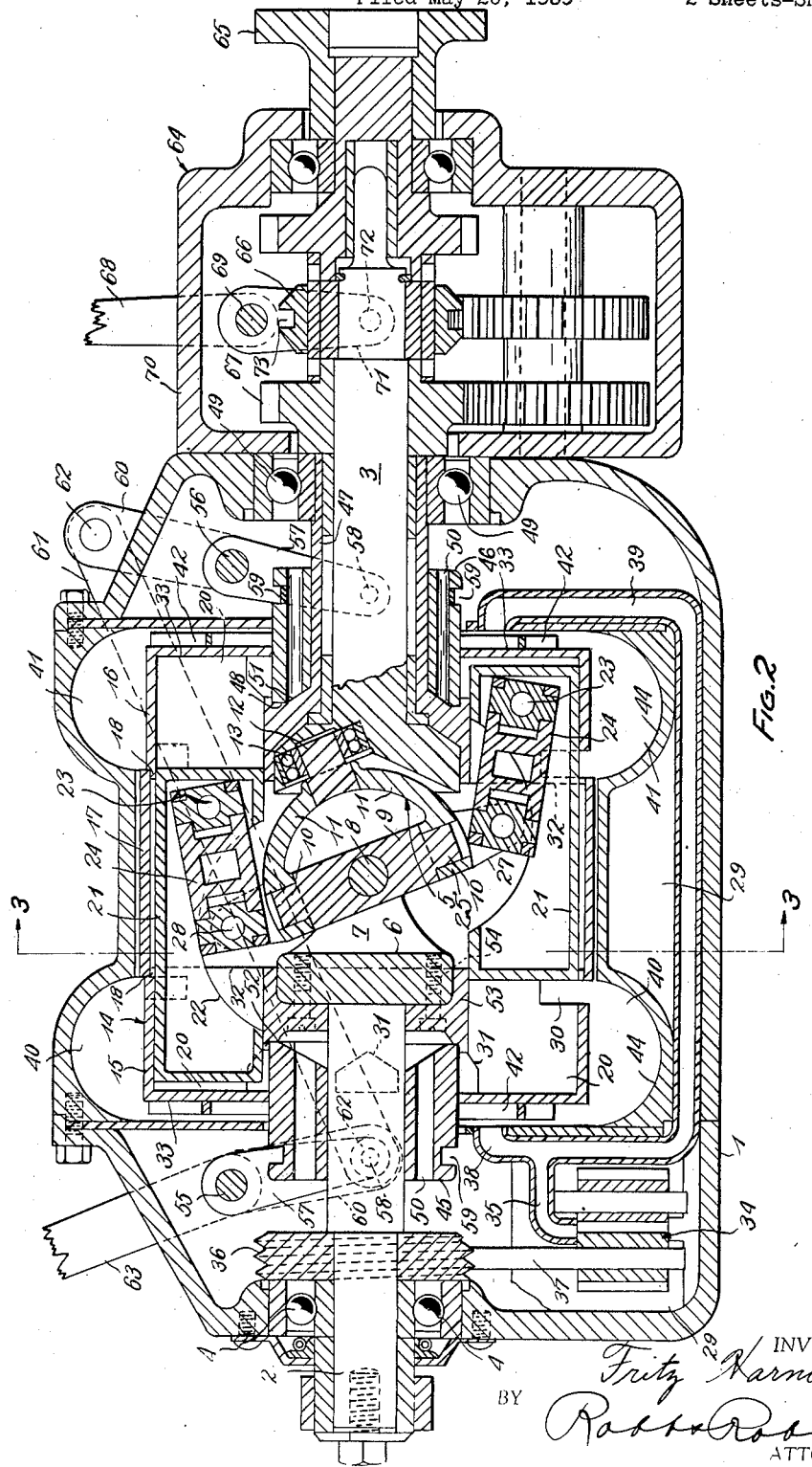

Patented Jan. 14, 1941

2,228,350

UNITED STATES PATENT OFFICE 2,228,350

HYDRAULIC TRANSMISSION

Fritz Harnisch, New Orleans, La.

Application May 20, 1939, Serial No. 274,820

13 Claims. (Cl. 192—59)

This invention relates to transmission mechanism, and more particularly to an infinitely variable transmission mechanism of the hydraulic type.

The principal purpose of the invention is to provide a novel form of mechanism for varying the speed ratio between a driving and a driven shaft. To this end, a driving member is employed for connecting the driving and driven shafts together, which is rotatable by the driving shaft and is rotatably connected to the driven shaft at a point spaced from the center of the driven shaft.

Since the eccentric location of the connection to the driven shaft places the driving member at an angle with respect to the axis of the driving and driven shafts, the connection of the driving member to the driving shaft is of the universal type to permit universal movement of the driving member with respect to the driving shaft. By reason of these connections of the driving member to the driving and driven shafts, rotation of the driving member about an axis inclined with respect to the axes of the driving and driven shafts is permitted.

In order that the driving member will be effective to transmit torque from the driving to the driven shaft, means is provided to resist free rotation of the driving member with respect to the driven shaft. To this end, cylinders having pistons mounted therein are connected to the driving shaft for rotation therewith. The pistons are connected to the driven member for the purpose of resisting rotary movement of the driving member with respect to the driven shaft. The cylinders are supplied with a hydraulic fluid, and valve mechanism is provided for controlling the exhaust of the fluid from the cylinders. As the exhaust of the fluid from the cylinders is cut off, the pistons will resist turning movement of the driving member with respect to the driven shaft, and the driving member will thereby become effective for transmitting torque from the driving to the driven shaft.

Accordingly, one of the objects of this invention is the provision of a novel form of transmission mechanism for varying the speed ratio between a driving and driven shaft.

Another object is to provide, in mechanism of the character referred to, a connecting member between the driving and driven shafts which will permit the transmission of torque from the driving to the driven shaft at various speed ratios.

Another object is to provide, in mechanism having a connecting member between a driving and driven shaft which will permit the transmission of torque at varying speed ratios, a novel form of hydraulic control means for controlling the speed ratio between the driving and driven shafts.

Another object is the provision of a novel form of valve device and valve operating mechanism for controlling the operation of the hydraulic mechanism by which the speed ratio between a driving and a driven shaft is governed.

Other objects and advantages of the invention will become apparent during the course of the following description.

In the drawings there is shown a preferred embodiment of the invention. In this showing:

Figure 2 is an enlarged longitudinal vertical sectional view of the hydraulic transmission and reverse gear mechanism shown in Figure 1.

Figure 1:
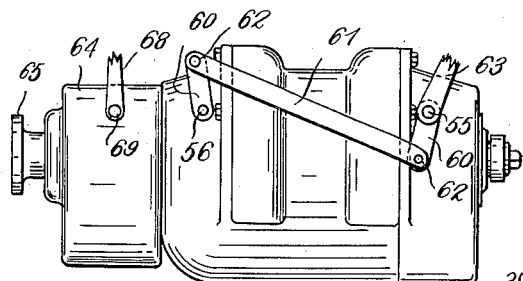
Figure 1 is a side elevational view of a hydraulic transmission and reverse gear mechanism showing a leverage system for controlling the transmission.
Figure 5:
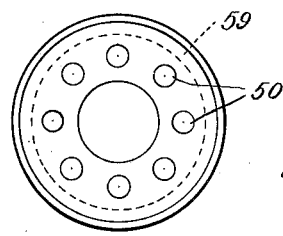
Figure 5 is an end view of one of the control valves.

Referring to the drawings, the numeral 1 indicates a housing for transmission mechanism for varying the speed ratio between a driving shaft 2 and a driven shaft 3. The driving shaft 2 is rotatably supported in the casing 1 by roller or ball-bearing bearings 4, and may be connected to any suitable form of power mechanism for transmitting a rotational movement thereto, such as the crank shaft of an automobile. Although the transmission mechanism is particularly applicable for use in connection with an automobile, it will be appreciated that the transmission is applicable in any case, where it is desired to vary the speed ratio between a driving and a driven member.

The driving shaft 2 and the driven shaft 3 are connected together by a connecting or driving member, indicated as a whole by the numeral 5. The connecting member 5 is secured to the driving shaft 2 by a bifurcated member 6, which is rotatable by the shaft 2. The bifurcated member 6 is provided with a pair of arms 7 supporting a cross shaft 8 on which the driving member 5 is mounted for a rocking movement about the axis of the shaft 8. The base plate 9 of the driving member 5 through which the cross shaft 8 passes is provided with trunnions 10, the axes of which are at right angles to the axis of the shaft 8. Arms 11 extending toward the driven shaft 3 are turnably connected to the trunnions 10. The arms 11 rigidly support a shaft 12 which is rotatably connected to the shaft (driven) 3 at a point offset from the center of the driven shaft 3 by roller or ball-bearing bearings 13.

By reason of the off center position of the shaft 12, it will be apparent that the driving member 5 must rotate about an axis inclined with respect to the axis of the driving shaft 2.

The connection of the driving member 5 permits universal movement of the member 5 with respect to the driving shaft 2, and thereby enables the driving member 5 to rotate about the axis of the shaft 12 without transmitting motion to the driven shaft 3. The driving member 5 will thereby rotate about an axis which is inclined with respect to the axes of the driving shaft 2 and the driven shaft 3 and this axis will preferably intersect the intersection of the axes of the cross shaft 8 and driving shaft 2 at a common point. The position of the axis of the shaft 12 with respect to the axis of the shaft 2 will be fixed at all times by the eccentric position at which the shaft 12 is rotatably connected to the driving shaft 3.

A cylinder housing, indicated as a whole by the numeral 14, is rigidly connected to the driving shaft 2 for rotation therewith in a manner to be described. The housing 14 is formed of two sections 15 and 16 spaced from each other, by a collar 17. The outer surfaces of the sections 15 and 16 form the surface of a cylinder and are cut away as at 18 to conform with the inner diameter of the collar 17, whereby the collar 17 will provide an abutment limiting movement of the sections 15 and 16 toward each other.

The sections 15 and 16 and the collar 17 are retained in abutting relationship as shown in Figure 2 by any suitable means such as the bolts 19.

Each of the sections 15 and 16 is provided with a plurality of cylinders 20. The number of cylinders in each section 15 and 16 is equal in number, and the cylinders are arranged in axial aligned pairs. Each pair of axial aligned cylinders has a double ended piston 21 having an end thereof mounted in each cylinder of the pair. Each piston is in the form of a cylinder and is provided with an opening 22 in order that the pistons may be connected to the driving member 5 for the purpose of imparting reciprocal motion to the pistons 21.

Figure 3:
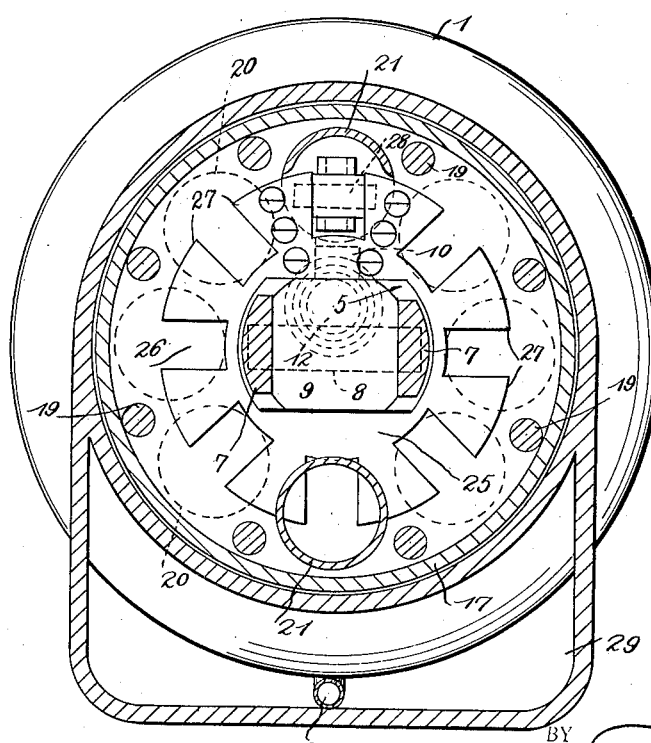
Figure 3 is a sectional view taken substantially in the line 3—3 of Figure 2.

Each piston is provided with a wrist pin 23 and a connecting rod 24 for connecting the pistons to the driving member 5. A web-like member 25 is rigidly secured to the driving member 5 for turning movement therewith and is provided with a plurality of notches 26 spaced apart from each other along the outer edge of the member 25, thereby providing adjacent pairs of projecting members 27. The number of notches 26 and pairs of projecting members 27 correspond to the number of cylinders in each of the sections 15 and 16, and, as best shown in Figure 3, the centers of the notches 26 are in alignment with the axes of each pair of aligned cylinders 20. In order to simplify the showing of Figure 3, only one piston 21 is illustrated as connected to the web 25. It will be appreciated that similar connections are actually provided for each of the other pistons.

A pin 28 is mounted transversely of each of the notches 26 and has each end thereof mounted in one of the pairs of projecting members 27. Each of the connecting rods 24 is turnably connected to one of the pins 28, thereby connecting each piston 21 to the driving member 5 through the web-like member 25. The connection of the pistons 21 with the web-like member 25 will thereby enable a reciprocatory motion to be imparted to the pistons 21 in a manner to be described.

In order that the driving member 5 will be effective to transmit torque to the driven member 3, free rotational movement of the driving member 5 with respect to the driven member 3 must be resisted. Hydraulic means for resisting reciprocatory motion of the pistons is provided for this purpose. The interior 29 of the casing 1 provides a reservoir for the storage of the hydraulic fluid which is used to resist reciprocal movement of the pistons 21.

Each of the cylinders 20 is provided with an inlet port 30 for the admission of hydraulic fluid thereto, and an exhaust port 31 to permit the exhaust of fluid from the cylinder. The inlet ports 30 are arranged adjacent the inner edges 32 of the sections 15 and 16. The exhaust ports 31 are located adjacent the outer ends 33 of the sections 15 and 16. In Figure 2, one of the exhaust ports 31 has been shown in dotted lines to better illustrate the general shape thereof. Since the cylinders 20 in each of the sections 15 and 16 are arranged concentrically with respect to the axis of the driving shaft 2, and the driven shaft 3, each of the sections 15 and 16 will be provided with a series of exhaust ports 31 and inlet ports 30 arranged concentrically with respect to the axes of the aforementioned shafts.

Hydraulic fluid is taken from the reservoir 29 by a gear pump, indicated as a whole by the numeral 34, and forced through a pipe 35. A worm gear 36 is mounted on the driving shaft 2 and meshes with a worm gear drive (not shown), mounted at the upper end of the shaft 37. Rotation of the shaft 37 will operate the gear pump 34 to supply fluid under pressure to the pipe 35. Obviously, any other suitable form of pumping mechanism may be used for supplying fluid to the pipe 35, which is provided with branches 38 and 39 for supplying fluid under pressure to annular chambers 40 and 41. Fluid is thereby maintained under pressure in each of the chambers 40 and 41, and will be forced into the cylinders 20, when any of the pistons 21 uncover one of the inlet ports 30.

Figure 4:
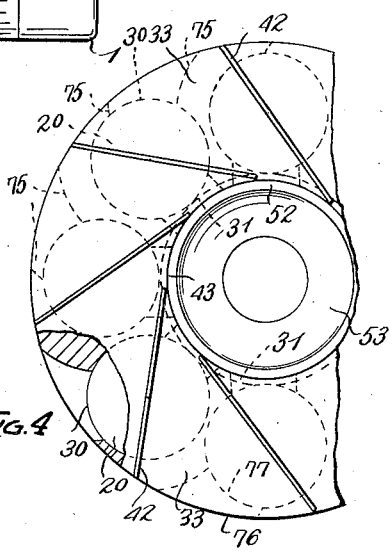
Figure 4 is an end view of one of the cylinder heads used in the transmission, a part thereof being broken away.

Paddles 42 are mounted on the heads 33 of each of the cylinder sections 15, and 16, for the purpose of forcing the fluid into the outer part of the annular chambers 40 and 41. As best shown in Figure 4, the paddles 42 are arranged tangentially with respect to the inner edges 43 of the sections 15 and 16. The outer surfaces 44 of the chambers 40 and 41 are semi-circular to facilitate the movement of the hydraulic fluid from the paddles 42 to the inlet ports 30 without creating a turbulent condition of the hydraulic fluid. The paddles 42 are arranged adjacent the outlets of the branch pipes 38 and 39 to pick up fluid pumped therethrough from the fluid reservoir. The fluid picked up by the paddles 42 is thrown off by centrifugal force due to the rotating motion of the paddles thereby imparting a velocity head to the fluid which will be directed by the curved surfaces 44 of the annular chambers 40 and 41 to the inlet ports 30.

An annular shaped sleeve valve 45 is provided for controlling the exhaust of hydraulic fluid from the cylinders 20 in the section 15 through the exhaust ports 31. The valve 45 is preferably mounted for rotation with the driving shaft 2 by a splined connection (not shown) which will permit longitudinal movement of the valve 45 with respect to the shaft 2.

The valve 46 is similarly constructed and is mounted on a sleeve 47 formed integrally with the inner part 48 of the section 16. The valve 46 is thereby rotatable with the sleeve 47 and slidable longitudinally of the sleeve 47. The sleeve 47 is rotatably supported in the casing 1 by roller or ball-bearing bearings 49.

Each of the valves 45 and 46 is provided with a plurality of openings 50 concentrically arranged with respect to the axes of the respective valves in which they are located.

When the valves 45 and 46 are moved outwardly with respect to each other to uncover the exhaust ports 31, hydraulic fluid may return through the ports 31 and the openings 50 to the storage reservoir 29 in the casing 1. To positively prevent the return of hydraulic fluid to the reservoir 29 when the ports 31 are in covered position with respect to their respective valves, the valve 46 is made to seat against the surface 51 formed on the inner part 48 of the section 16 thereby effectively blocking the passages 50 in the valve 46. Similarly, the valve 45 is made to seat against a surface 52 formed on the inner part of the section 15, thereby effectively blocking the openings 50 in the valve 45. In order that the housing 14 comprising the sections 15 and 16 will be rotatable with the driving shaft 2, the inner part 55 of the section 15 is secured to the bifurcated member 6 by fastening devices 54.

It is desirable that the opening and closing of the ports 31 by the valves 45 and 46 be accomplished simultaneously. A leverage system is provided for effecting simultaneous movement of the valves 45 and 46 toward and away from each other.

This system comprises a pair of shafts 55 and 56, respectively rotatably mounted in the casing 1 adjacent the valve devices 45 and 46. Each of the rock shafts 55 and 56 has an identical rock arm 57 rigidly secured thereto. The arms 57 have pins 58 projecting therefrom, which are engageable with circular grooves 59 formed in the valves 45 and 46 whereby a rocking movement of the arms 57 will be effective to impart a longitudinal movement to the valves 45 and 46. Identical levers 60 are secured to the rock shafts 55 and 56 outwardly of the casing 1. A link 61 is pivotally connected to the ends of the levers 60 by pivot pins 62. The levers 60 are positioned substantially 180° apart in order that clockwise movement of one of the levers 60 will effect through the link 61 counterclockwise movement of the other lever 60. A manually operable rock arm 63 is rigidly secured to the shaft 55 for simultaneously controlling movement of the valves 45 and 46. It will be apparent that movement of lever 63 in a clockwise direction will move the lever 57 in a similar direction to open the valve 45. Such movement of the manually operable lever 63 will effect counterclockwise movement of the rock arm 57 through the link 61 to move the valve 46 outwardly with respect to the valve 45. The valves 45 and 46 are thereby movable simultaneously away from or towards each other to simultaneously open and close all of the exhaust ports 31 in each of the sections 15 and 16.

Since the transmission is operable for transmitting motion to the driven shaft in one direction only, reverse gear mechanism indicated as a whole by the numeral 64 is provided to enable rotation of a driving member 65 in either direction.

The reverse gear mechanism 64 may be any type of a number of well known conventional reverse gear mechanisms, and is, therefore, not shown in detail. It will be sufficient to point out that the reverse gear mechanism is provided with a dog clutch 66 for directly clutching the driven shaft 3 to the member 65 or indirectly to the shaft 65 through the reverse gear mechanism by moving the dog clutch 66 into engagement with the gear 67. A manually operable lever 68 is rigidly connected to a shaft 69 rotatably mounted in the casing 70. The shaft 69 has a rock arm 71 connected thereto inwardly of the casing 70. A pin 72 is mounted on the end of the rock arm 71 and is engageable with a groove 73 formed in the dog clutch 66 in order that the member 68 will be operable to move the clutch 66 to make the desired connection with the driving member 65.

The operation of the invention is as follows:

Assuming that the valve devices 45 and 46 have been moved outwardly with respect to each other, all of the exhaust ports 31 will have been uncovered. In such case, with the driving shaft 2 being rotated by a suitable power device such as an automobile engine, the transmission will be inoperative to transmit torque or movement to the driven shaft 3. The cylinders 20 will be rotated by the driving shaft 2 and the driving member 5 will likewise be rotated by the driving shaft 2, through its connection to the cross shaft 8. As pointed out heretofore, the driving member 5 will be rotated about an axis inclined with respect to the axis of the driving shaft 2 by reason of its eccentric connection to the driven shaft 3.

The web member 25 being secured to the driving member 5, each of the pins 28 will move in a circle about the inclined axis of the driving member 5 and thereby impart a reciprocatory motion to the pistons 21. The web member 25 and the pins 28 are so positioned that the axes of all the pins 28 lie in a common plane containing the axes of the trunnions 10 and the shaft 8 and occupying a position perpendicular to the axis of rotation of the member 5 and shaft 12.

As long as the ports 31 remain uncovered, and the pistons 21 are permitted to reciprocate freely in the cylinders 20, no torque will be transmitted to the driven shaft 3. However, as soon as the valves 45 and 46 are moved towards each other to restrict exhaust of hydraulic fluid from the cylinders 20, the reciprocating movement of the pistons 21 will be resisted by the hydraulic fluid trapped in the cylinders 20. The resistance of the fluid to the movement of the pistons 21 will be transferred through the connecting rods 24 to the web member 25, and thence to the driving member 5. Such resistance enables the driving member 5 to become effective for transmitting torque to the driven shaft 3.

Since the housing 14 is connected to the driving shaft 2, it will be apparent that the housing 14 and the member 5, due to its connections with the cylinder housing 14 through the member 25 and with the shaft 2 through the member 6, will rotate with the driving shaft 2. Initially, the rotational movement of the member 5 will be relative or with respect to the driven shaft 3 as long as this shaft remains stationary. However, as exhaust of fluid from the cylinders is prevented, the shaft 3 will begin to rotate and the relative rotational movement of the member 5 with respect to the shaft 3 will be gradually decreased as the speed of the shaft 3 increases. Under such conditions, the movement of the member 5 is compound consisting of rotational movement relative to the shaft 3 and a bodily movement with the shaft 3 causing the axis of the part 12 to describe an imaginary cone having as its vertex, the intersection of the axes of the parts 8 and 9.

When the valves 45 and 46 are moved to the closed position, illustrated in Figure 2, the hydraulic fluid will be unable to escape from the cylinders 20, the driving member and reciprocating movement of the pistons 21 will thereby be stopped. Accordingly, it will be apparent that whenever movement of the pistons 21 is prevented, the driving member 5 will be unable to rotate with respect to the driven member 3 and will thereby become effective for transmitting torque from the driving shaft 2 to the driven shaft 3 at a speed ratio of one to one.

With the shaft 2 and shaft 3 operating in such fashion, it will be apparent that the axis of the driving member 5 will circumscribe an imaginary figure in the shape of a cone, having as its vertex, the point of intersection of the axes of the drive shaft 2, and driving member 5.

Between the opened and closed positions of the exhaust ports 31, it will be apparent that the speed ratio of the driving shaft 2 to the driven shaft 3 will vary infinitely from one to zero, to one to one.

It will be apparent that when the driven shaft 2 is operatively connected to a power means such as the crank shaft of an automobile engine, the parts of the transmission as shown in Figures 3 and 4 will be rotating in a clockwise direction. In order to facilitate charging of the cylinders 20 with hydraulic fluid, the sides of the inlet ports 30 as indicated by the dotted lines 75 are curved whereby the outer ends 76 of each port 30 will lead with respect to the inner ends 77 when the parts of the transmission are rotating in a clockwise direction. By forming the ports 30 in this manner, a scoop-like action is provided which permits the edges of the ports 30 to scoop up fluid and direct it into its associated cylinder 20.

The general arrangement of the cylinders 20 in each of the blocks 15 and 16 is best illustrated in Figure 3. From this showing, it will be apparent that eight cylinders, concentrically arranged about a common axis, are provided in each of the blocks 15 and 16 thereby providing sixteen cylinders in all. It will be appreciated that a greater or less number of cylinders 20 and corresponding associated parts may be employed as the occasion requires. However, it is necessary that the same number of cylinders 20 be employed in each of the blocks 15 and 16 and that they be arranged in axially aligned pairs as described.

Having thus described my invention, what I claim as new and desire to secure by Letters Patent of the United States, is:

1. In mechanism of the character described, a driving element, and a driven element, means for transmitting motion from said driving element to said driven element at varying speed ratios comprising a member rotatable about an axis inclined with respect to the axes of said driving and driven elements, means connecting said member to said driving element for turning movement therewith, means connecting said member to said driven element at a point offset from the center thereof for turning movement relative thereto, and means resisting turning movement of said member with respect to said driven element whereby said member will be effective to transmit torque to said driven element, comprising a pair of axially aligned cylinders rotatable with said driving member, a double-ended piston having an end thereof mounted in each cylinder and having a connection with said member for reciprocation thereby, means for supplying fluid to each of said cylinders, and separate valve means for each cylinder for simultaneously controlling the exhaust of fluid therefrom.

2. In mechanism of the character described, a driving element and a driven element, means for transmitting motion at variable speed ratios between said elements comprising a plurality of pairs of axially aligned cylinders rotatable with and radially arranged with respect to said driving element thereby providing two sets of opposed cylinders annularly disposed about said driving element, each of said pairs being provided with a double-ended piston having an end thereof extending into each cylinder of one of said pairs, a driving member between said elements and connected to said pistons for imparting a reciprocating motion thereto, means for supplying fluid to said cylinders, each cylinder being further provided with similarly arranged exhaust ports, separate valve devices for each set of opposed cylinders, and means for simultaneously moving said valve devices in opposite directions for simultaneously controlling the exhaust of fluid from all of said cylinders through said exhaust ports.

3. Mechanism as claimed in claim 2, wherein the last named means comprises a manually operable leverage system for securing movement of said valve devices in opposite directions.

4. Mechanism as claimed in claim 2, wherein the last named means comprises a separate rock shaft mechanically connected to each valve device, a rock-arm secured to each of said rock shafts, and a single link having a pivotal connection with each of said rock-arms, said link and rock-arms being arranged in a manner to effect equal movement of said rock shafts and the valves connected thereto in opposite directions upon movement of said link in a single direction.

5. In mechanism of the character described, a driving element and a driven element, means for transmitting motion at variable speed ratios between said elements comprising a plurality of pairs of axially aligned cylinders rotatable with and radially arranged with respect to said driving element thereby providing two sets of opposed cylinders annularly disposed about said driving element, each of said pairs being provided with a double-ended piston having an end thereof extending into each cylinder of one of said pairs, a driving member universally connected to said driving element for rotation thereby, said driving member further having a part thereof rotatably connected to said driven element at a point offset from the center thereof whereby said member will be rotated about an axis inclined with respect to the axes of said driving and driven elements, said driving member further having a connection with each of said pistons for imparting a reciprocating movement thereto, means for supplying fluid to said cylinders, and means for variably controlling the exhaust of fluid from said cylinders whereby turning movement of said member with respect to said driven element will be variably resisted and said member will be effective to transmit torque in accordance with the amount of resistance to said turning movement.

6. In mechanism of the character described, a driving element and a driven element, a member for transmitting motion from said driving to said driven element and rotatable about an axis inclined with respect to the axes of said driving and driven elements, means connecting said member to one of said elements for turning movement therewith, means connecting said member to the other of said elements for turning movement relative thereto, and means resisting relative turning movement of said member whereby said member will be effective to transmit torque comprising a pair of axially aligned cylinders rotatable with said driving element, pistons in each of said cylinders having a common connection with said member for reciprocation thereby, means for supplying fluid to each of said cylinders, and valve means controlling the exhaust of fluid therefrom.

7. Mechanism as claimed in claim 6, wherein said valve means comprises separate valve devices for each cylinder for simultaneously controlling the exhaust of fluid therefrom.

8. In mechanism of the character described, a driving element and a driven element, means for transmitting motion at variable speed ratios between said elements comprising a plurality of cylinders rotatable with one of said elements, a piston mounted in each of said cylinders, a driving member between said elements and connected to each of said pistons for imparting a reciprocating motion thereto, each of said cylinders being provided with separate ports for the admission and exhaust of fluid therefrom, a source of fluid supply, and impeller blades mounted to receive fluid from said source and rotatable with said cylinder for imparting a velocity head to the fluid so received by centrifugal force.

9. Mechanism as claimed in claim 8, together with a stationary housing for said cylinders, said housing having a curved surface adapted to receive fluid from said impeller blades and direct such fluid to the inlet ports of said cylinders.

10. Mechanism as claimed in claim 8, together with a stationary housing for said cylinders providing a pressure chamber for receiving fluid from said exhaust ports and supplying fluid to said inlet ports, a fluid reservoir, and a fluid pump in said reservoir for supplying fluid under pressure to said chamber, said housing having a curved surface adapted to receive fluid from said impeller blades and direct such fluid to the inlet ports of said cylinders.

11. In mechanism of the character described, a driving element and a driven element, means for transmitting motion at variable speed ratios between said elements comprising a plurality of cylinders rotatable with one of said elements, a piston mounted in each of said cylinders, a driving member between said elements and connected to each of said pistons for imparting a reciprocating motion thereto, each of said cylinders being provided with separate ports for the admission and exhaust of fluid therefrom, a stationary housing for said cylinders providing a pressure chamber for receiving fluid from said exhaust ports and supplying fluid to said inlet ports, a fluid reservoir, and a fluid pump in said reservoir for supplying fluid under pressure to said pressure chamber.

12. In mechanism of the character described, a rotatable driving element and a rotatable driven element, motion transmitting means between said elements comprising a member connected to said driving element for rotation therewith, and a bearing mounted on said driven element at a point offset from the axis thereof, the axis of said bearing intersecting and being inclined with respect to the axis of said driving element, said member having a part thereof journaled in said bearing for connecting said member to said driven element, the connections of said driving and driven elements with said member being operative to cause rotating movement of said member relative to said driven element and about the inclined axis of said bearing when said driving element is rotating with respect to said driven element, and means for resisting rotation of said member relative to said driving element for causing said driven element to be rotated with said driving element.

13. In mechanism of the character described, a rotatable driving element and a rotatable driven element, means for transmitting motion at variable speed ratios between said elements comprising a plurality of cylinders and a motion transmitting member connected to said driving element for rotation therewith, a bearing mounted on said driven element at a point offset from the axis thereof, the axis of said bearing intersecting and being inclined with respect to the axis of said elements, said member having a part thereof journalled in said bearing for connecting said member to said driven element, the connections of said elements with said member being operative to cause rotating movement of said member relative to said driven element and about the inclined axis of said bearing when said driving element is rotating with respect to said driven element, each of said pistons having a separate connection with said member for reciprocation thereby, said separate connections lying in a common plane positioned at right angles to the inclined axis of said bearing and intersecting with the axes of said elements and said inclined axis at a common point, means for supplying fluid to said cylinders, and valve means controlling the exhaust of fluid from said cylinders.

FRITZ HARNISCH.